Dec. 27, 1966      H. L. PENBERTHY      3,294,512
GLASS FURNACE
Filed May 22, 1963
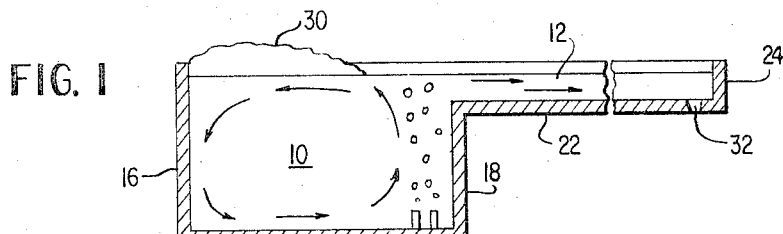
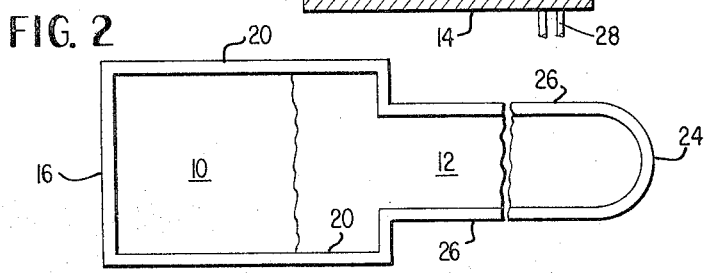
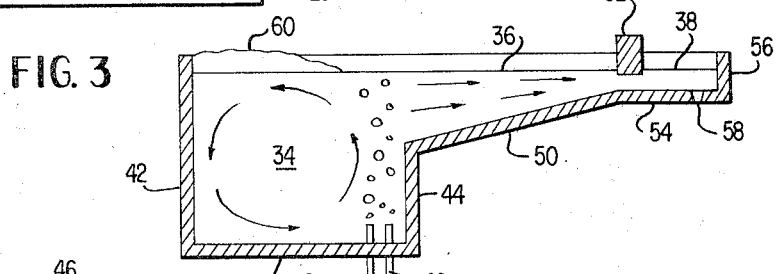
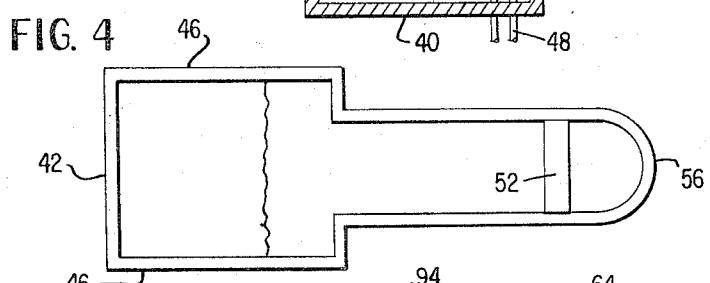
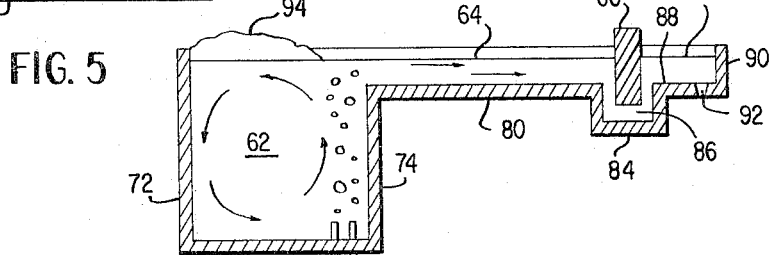
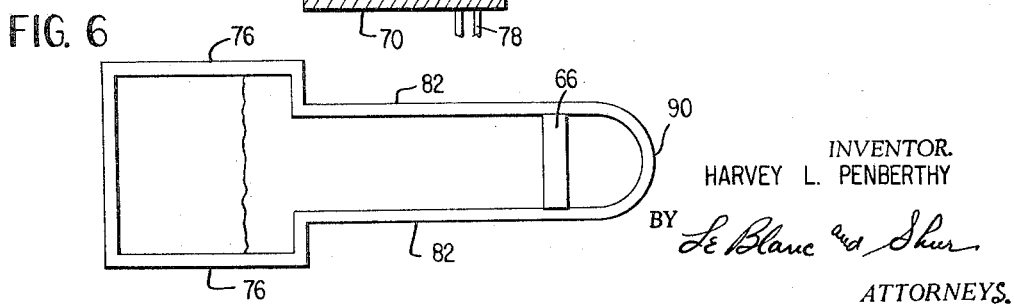
INVENTOR.
HARVEY L. PENBERTHY
BY *Le Blanc and Shur*
ATTORNEYS.

3,294,512
GLASS FURNACE
Harvey L. Penberthy, 5624 SW. Admiral Way,
Seattle, Wash. 98116
Filed May 22, 1963, Ser. No. 282,301
5 Claims. (Cl. 65—178)

This invention relates to glass furnaces and more particularly relates to an improved glass furnace having a step in the floor between the melting and fining zones and utilizing a fluid pump to create a combination of artificially reinforced convection currents in the melting zone and an absence of convection currents in the fining zone.

In standard continuous process glass manufacture the material to be treated is charged at one end of the furnace and removed at the other end in the form of molten finished glass, being subjected successively in its passage through the furnace to the operations of melting, fining and conditioning or cooling toward a working temperature. The furnaces that carry out this preparation of the glass generally include three zones roughly correponding to the three phases of manufacture, and these zones are generally referred to as the melting, fining and working or conditioning zones. At times some of these zones are combined, but in the more modern furnaces, barriers or bridge walls have been erected in an attempt to isolate the three steps of the process.

In such furnaces, a bridge wall is frequently located between the melting and fining zones and this wall is provided with a submerged throat which permits the passage of glass therethrough. The purpose of the wall is to prevent unmelted glass from entering the fining and subsequently the conditioning zones and possibly getting into the ware. Even with the use of such a barrier, however, it has been difficult to prevent all unmelted batch from entering the conditioning zone since, in ordinary usage, the flow of glass through the throat exercises a strong eroding action on the edges of the wall introducing stones and other impurities into the glass and fairly rapidly wearing away the wall so that replacement is frequently necessary.

This problem has been recognized and some attempts have been made to operate furnaces without bridge walls or throats as described, for example, in Amsler Patent No. 1,941,779. Difficulties were experienced, however, in preventing unmelted batch from entering the conditioning zone and, as one possible solution, the conditioning and fining zones were connected and separated by a shallow channel which was relatively long and designed to have a long circulating current therein. See, for example, FIGURE 2 of the aforementioned Amsler patent. While this construction was attended with some measure of success, relatively large tank dimensions are involved along with low rates of production and high operating costs. Other continuous throatless furnaces which are exemplary of prior practices are found in United States Patents Nos. 1,870,242; 1,937,390; and 2,313,217. The prior two patents are subject to the same general remarks as the Amsler patent while the third patent comprises an electric furnace which utilizes a very considerable amount of power.

Other workers in the field have attempted various constructions using stepped floors of the general type shown by Amsler and the following United States patents are exemplary of such a construction: 1,953,034; 2,203,269; and 2,616,221. In the first of these patents an extremely shallow melting zone is utilized in connection with a much deeper furnace zone which is divided by a bridge wall into fining and tempering compartments. The second patent shows a series of upwardly rising barriers rather than truly stepped furnace floors. The third patent provides a small step in the furnace floor at the furnace hot zone and provides a submerged throat between the fining zone and the subsequent conditioning zone.

According to the present invention, it has now been found that substantially improved furnace operation may be achieved, both from the standpoint of improved quality and economy, through the unique creation of a melting zone convection current and elimination of convection currents in a very shallow fining zone adjacent the melting zone. Thus, according to the present invention there is provided a relatively deep melting zone bordered by a step in the furnace floor at the demarcation line between the melting and fining zones. The combustion heat may be applied to the furnace in such a manner as to form the hottest area in the furnace at this dividing line, or on the fining zone side of this line (although this is not necessary), and a fluid pump is provided to create a rising stream of glass in the melting zone at this step.

The shallow fining zone is provided with such a small depth as to substantially preclude the formation of any convection currents, the only glass flow being the unidirectional laminar current which proceeds toward the working or conditioning zone. The artificially created rising stream of glass at the boundary between the melting and fining zones creates a thorough mixing in the melting zone with convection currents far too strong to permit the escape of seed or bubbles. The depth of the melting zone is preferably at least several times that of the fining zone and the shallow fining zone, with its absence of convection currents, permits easy escape of the seeds or bubbles.

As a means for creating the rising convection current at the juncture of the melting and fining zones, it is preferred to utilize a gaseous pump which comprises a series of bubbler tubes which may be disposed in the manner disclosed in copending application Serial No. 707,580, filed January 7, 1958, now Patent No. 3,030,736. It has also been found that a similar effect may be achieved through the use of as few as two electrodes extending up through the bottom of the furnace for a short distance into the deep furnace zone. Such electrodes need not be long, nor need the expenditure of power be substantial, in that it is only desired to create a rising stream of glass rather than transfer any large amount of heat to the glass mass. In the case of both bubblers and electrodes it is desirable that the disposition of bubblers and electrodes be such that the convection current extends substantially across the furnace, and to this end row type arrangements may be used.

It is accordingly a primary object of the present invention to provide an improved glass furnace utilizing a deep melting zone with artificially stimulated convection currents in combination with a very shallow fining zone which is substantially free of convection currents.

It is another object of the present invention to provide an improved glass furnace having a relatively deep melting zone adjacent a quite shallow fining zone with a means for artificially stimulating convection currents in the melting zone disposed at the juncture between these two zones.

It is still another object of the invention to provide an improved glass furnace having a deep melting zone adjacent a shallow fining zone with a means for artificially creating a convection current at the juncture of such zones so as to provide a higher degree of mixing in the melting zone and an efficient seed liberation in the fining zone without the necessity of a bridge wall between the melting and fining zones.

These and further objects and advantages of the invention will become more apparent upon reference to the following specification and claims and appended drawings wherein:

FIGURE 1 is a vertical section through a glass furnace constructed according to one embodiment of the invention;

FIGURE 2 is a plan view of the glass furnace of FIGURE 1;

FIGURE 3 is a vertical section through a glass furnace constructed according to another embodiment of the invention;

FIGURE 4 is a plan view of the glass furnace of FIGURE 3;

FIGURE 5 is a vertical section of a glass furnace constructed according to still another embodiment of the invention; and FIGURE 6 is a plan view of the glass furnace of FIGURE 5.

Referring more particularly to FIGURES 1 and 2 of the drawing, there is shown a partial view of a glass furnace having a deep compartment 10 connected to a shallow compartment 12. The deep compartment 10 is comprised of a floor 14, back wall 16, step wall 18, and side walls 20. The shallow zone 12 is in turn formed by a floor 22, front wall 24 and side walls 26. It will be understood that the drawings show only the lower portion of the furnace and do not depict the arch and combustion heating arrangement which may be completely conventional.

A series of bubbler tubes 28 are provided in the furnace floor adjacent the step wall 18 and may be disposed in groups of three so that each group of three bubblers cooperates to produce a rising stream of glass. According to a preferred embodiment of the invention, the bubbler tubes may be disposed in a triangular configuration. While plural groups of bubblers may be utilized in row configuration and form the preferred embodiment of the invention, it is to be understood that a lesser number may be used so long as the bubbles are adequate to create a rising stream of glass at and along the step wall 18.

The furnace illustrated in FIGURES 1 and 2 is foreshortened in the drawings as indicated by broken lines in the shallow zone and may be functionally divided in the following manner. The deep zone to the left of the step wall 18 comprises the melting zone of the furnace and is substantially covered with unmelted batch 30. The highest temperature in the furnace may commence just to the left of the step wall 18 and directly above the rising current of glass created by the bubblers 28, although this temperature distribution is not necessary according to all modes of operation of the invention. As a matter of fact the furnace of the invention permits operation with the melting zone completely covered with batch so that the hot zone commences on the fining zone side of the demarcation line. This high temperature may be maintained for a substantial distance to the right of the step wall 18 and the fining zone of the furnace may consist of this high temperature zone. As the glass proceeds beyond this zone, its temperature starts to fall and this falling temperature zone of the furnace constitutes the conditioning or working zone. A suitable draw-off orifice 32 may be provided for removing conditioned glass.

According to the invention, unmolten batch is fed into the furnace through a suitable dog house or other opening immediately above the backwall 16 and is subjected to the combustion heat in the melting zone. Bubbles from the bubbler tubes 28 create a strenuous rising current of glass at the step wall 18 indicated by the arrows in FIGURE 1. This current flows in a counterclockwise direction, vigorously mixing the glass and melting unmolten batch from the bottom of the batch pile. The rising stream of glass thus created by the bubblers in conjunction with the disparity in depth between the melting and fining zones prevents the entrance of any substantial amount of unmolten glass into the shallow fining zone. This same vigorous stirring action in the melting zone prevents entrapped seed or bubbles from escaping from the molten mass in the melting zone. In the fining zone, however, a substantially laminar flow is achieved while the glass is subjected to the highest temperature in the furnace. Under such conditions, seed readily escapes so that by the time the temperature in the shallow zone begins to decrease (i.e., the conditioning zone is reached), the glass is substantially seed and stone free.

It is to be noted that such a furnace eliminates the necessity for a deep bridge wall between the melting and fining zones with the concomitant erosive action which deposits relatively large amounts of stone and other refractory material in the glass. At the same time, the fluid pump, which may comprise either bubblers or short electrodes, consumes no substantial amount of power so that the advantageous results are obtained without the expenditure of any additional amount of energy.

The embodiment of the invention illustrated in FIGURES 1 and 2 operates without a skimmer. However, it is to be understood that the furnace and method of the invention also comprehends operation with a skimming device. Referring to FIGURES 3 and 4 there is shown another embodiment of the invention wherein the use of a skimmer permits a shortening of the furnace. According to this embodiment, the furnace comprises a deep melting zone 34, a shallow fining zone 36, and a shallow conditioning zone 38. The melting zone is formed by a floor 40, backwall 42, step wall 44 and side walls 46. Bubbler tubes 48 are disposed adjacent the step wall 44 in the manner described in connection with FIGURES 1 and 2.

According to this embodiment of the invention, the shallow fining zone 36 is formed with an inclined floor 50 which forms a zone of increasingly lesser depth as it extends toward the conditioning zone. A skimmer 52 may be provided between the fining zone 36 and conditioning zone 38 and may extend down into the molten glass mass only a very short distance adequate to hold back the bubbles forming on the surface of the glass mass where a shortened furnace is used. The conditioning zone is formed of a floor 54, front wall 56, and contains an orifice 58.

In the operation of this embodiment of the invention, the molten batch 60 is introduced into the deep melting zone and is there subjected to the combustion heat in the furnace. As described in conjunction with the preceding embodiment, the highest temperature zone may commence immediately above the thermal pump, here comprised of the bubblers 48, and may extend substantially to the skimmer 52. The fluid pump creates a convection current in a counterclockwise direction as indicated by the arrows in FIGURE 3. The combination of the convection current and rather substantial disparity between the depth of the melting and fining zones prevents the entrance into the fining zone of any unmolten glass. A substantially laminar flow is obtained in the fining zone with the seed or bubbles rising to the surface of the glass to be skimmed back by the skimmer. The floor of the fining zone is gradually inclined so that any solid materials deposited on the floor have a tendency to slide back into the melting zone. It will be appreciated that the laminar flow which exists in the fining zone is responsible both for the efficient escape of seed and also for the deposit of unmolten material on the fining zone floor.

Referring to FIGURES 5 and 6, there is seen still another embodiment of the invention wherein a furnace is provided with a deep zone 62, a shallow zone 64, a bridge wall 66 and conditioning zone 68. The melting zone 62 is formed of a floor 70, backwall 72, step wall 74 and side walls 76. A bubbler arrangement 78 may be provided adjacent the step wall as in the preceding embodiments of the invention. The fining zone is comprised of a floor 80, side walls 82 and bridge wall 66. Immediately beneath the bridge wall 66 there is provided a descending furnace portion 84 which forms a submerged conduit 86, between the fining and conditioning zones. The conditioning zone is comprised of a floor 88, front wall 90 and orifice 92.

While the embodiments illustrated in FIGURES 1 through 4 are illustrative of the fact that the furnace of this invention is capable of operating without a submerged bridge wall, embodiment of FIGURES 5 and 6 shows that a wall of this type may be used between the fining and conditioning zones where desired. According to this embodiment of the invention batch 94 is introduced into the furnace in the deep melting zone and, as previously described, the hottest area in the furnace may start at the point of the fluid pump 78 and may extend through the fining zone to the bridge wall 66. The fluid pump 78 creates the counterclockwise convection current in the deep melting zone to create a vigorous mixing action which rapidly melts the floating batch and thoroughly mixes the contents of the melting zone.

The fining zone 80 is shallow to the point of preventing the formation of convection currents and the laminar flow that occurs therein permits the escape of seed. The bridge wall 66 provides an extra safeguard against the entrance of unmolten batch into the conditioning zone and also skims the seed so as to insure a thorough fining action. Conditioned glass may be drawn from the orifice 92. While the floor of the fining zone 64 is shown as being horizontal, an inclined floor, such as that shown in FIGURE 3, may be utilized where desired.

It will be apparent from the foregoing that the furnaces of this invention provide a deep melting zone having a deliberately created convection current causing glass to flow up the step wall and back under the floating batch towards the back wall of the furnace. This action occurs regardless of whether the batch covers the entire melting zone or not. Immediately adjacent this deep melting zone there is provided a shallow fining zone which is sufficiently shallow to prevent the formation of a return convection current and thereby permit the creation of laminar glass flow. While this depth is dependent upon temperature and flow conditions, the depth of the fining zone is preferably less than half that of the melting zone. All of these furnaces operate without a bridge wall between the melting and fining zones and may operate without any bridge wall whatsoever in the furnace. A skimmer may or may not be utilized depending upon the space available for the furnace and a bridge wall between the fining and conditioning zones may be resorted to where desired, although this is not necessary. The operation in all cases prevents the introduction into the glass mass of materials which conventionally erode away from a submerged throat between the melting and fining zones and permits the production of glass without the introduction into the glass mass of large amounts of electrical energy in addition to those provided by the conventional combustion heating.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A glass furnace comprising a tank forming melting, fining and conditioning zones, said melting zone having a greater depth than the contiguous shallow fining zone, said change in depth being effected by a submerged wall, and means in said melting zone adjacent said submerged wall for creating a stream of molten glass rising from the bottom of said melting zone along said submerged wall to the surface of the glass mass, said fining zone having an increasingly more shallow depth as it extends toward said conditioning zone.

2. A glass furnace comprising a tank forming melting, fining and conditioning zones which are in communication with one another at the surface of a glass mass in said tank, said melting zone having a greater depth than the contiguous shallow fining zone, said change in depth being effected by a submerged wall, and means substantially at the floor of said melting zone adjacent said submerged wall for creating a stream of molten glass rising from the bottom of said melting zone along said submerged wall to the surface of the glass mass, the hottest zone in said furnace extending from a position at the surface of the glass mass over said rising stream creating means into said fining zone, said melting zone being sufficiently deep to support a vigorous convection current and said fining zone being less than one-half the depth of said melting zone and sufficiently shallow to be substantially free of convection currents, said fining zone having an increasingly more shallow depth as it extends toward said conditioning zone.

3. A glass furnace comprising a tank forming melting, fining and conditioning zones, said melting zone having a greater depth than the contiguous shallow fining zone, said change in depth being effected by a submerged wall, and means in said melting zone adjacent said submerged wall for creating a stream of molten glass rising from the bottom of said melting zone along said submerged wall to the surface of the glass mass, said melting zone being sufficiently deep to support a vigorous convection current and said fining zone being sufficiently shallow to be substantially free of convection currents, the depth of said fining zone being increasingly more shallow as it extends toward said conditioning zone.

4. A glass furnace comprising a tank forming melting, fining and conditioning zones, said melting zone having a greater depth than the contiguous shallow fining zone, said change in depth being effected by a submerged wall, and means in said melting zone adjacent said submerged wall for creating a stream of molten glass rising from the bottom of said melting zone along said submerged wall to the surface of the glass mass, said melting zone being sufficiently deep to support a vigorous convection current and said fining zone being sufficiently shallow to be substantially free of convection currents, and a skimmer between said fining and conditioning zones, said fining zone having an increasingly more shallow depth as it extends toward said conditioning zone.

5. A glass furnace comprising a tank forming melting, fining and conditioning zones, with at least said melting and fining zones being in communication with one another at the surface of a glass mass in said tank, said melting zone having a greater depth than the contiguous shallow fining zone, said change in depth being effected by a submerged step in the furnace floor at the demarcation line between the melting and fining zones, a fluid pump in said melting zone adjacent said submerged step for creating a stream of molten glass rising from the bottom of said melting zone along side said submerged step to the surface of the glass mass, combustion heat in said furnace forming as the hottest area in the furnace that area extending from a position at the surface of the glass mass adjacent said step into said fining zone, said melting zone being sufficiently deep to support a vigorous convection current and said fining zone being less than one-half the depth of said melting zone and sufficiently shallow to be substantially free of convection currents.

References Cited by the Examiner

UNITED STATES PATENTS

| | | | |
|---|---|---|---|
| 1,597,440 | 8/1926 | Ferngren | 65—347 X |
| 2,122,469 | 7/1938 | Hitner | 65—347 X |
| 2,162,983 | 6/1939 | Sullivan. | |
| 2,387,222 | 10/1945 | Wright | 65—135 X |
| 3,198,618 | 8/1965 | Penberthy | 65—135 X |

DONNALL H. SYLVESTER, *Primary Examiner.*

A. D. KELLOGG, *Assistant Examiner.*